April 3, 1951    E. E. WHITE    2,547,103
FISH PLUG
Filed April 19, 1946
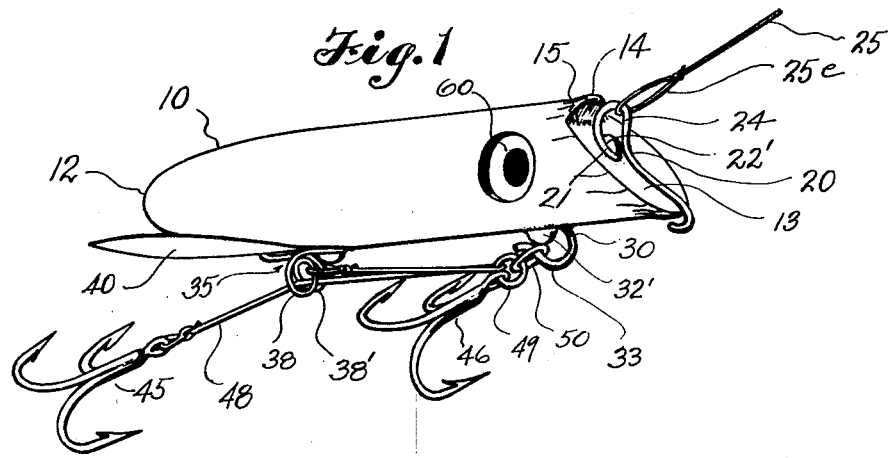
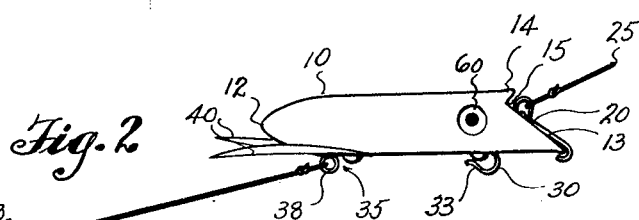
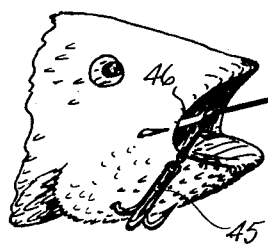
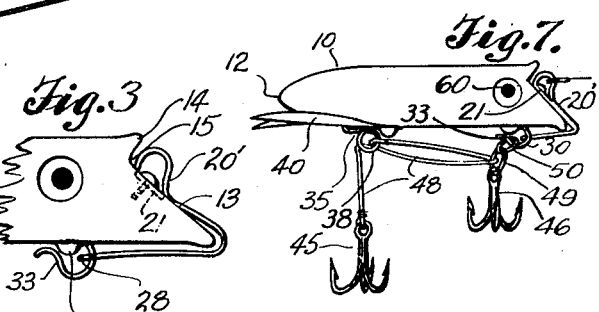
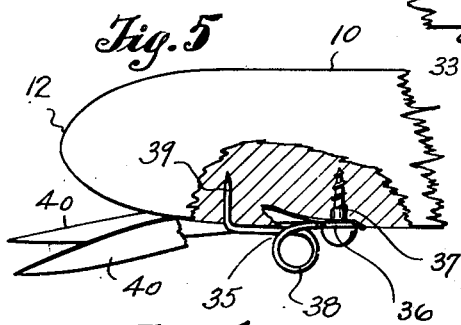
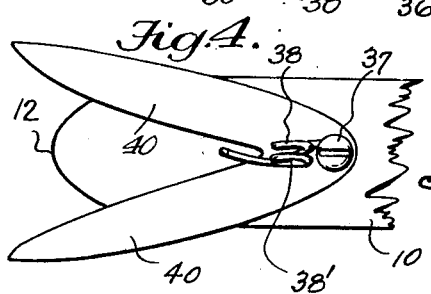
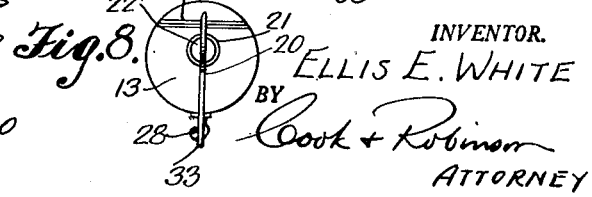
INVENTOR.
ELLIS E. WHITE
BY Cook + Robinson
ATTORNEY Patented Apr. 3, 1951

2,547,103

UNITED STATES PATENT OFFICE 2,547,103

FISH PLUG

Ellis E. White, Bremerton, Wash.

Application April 19, 1946, Serial No. 663,262

1 Claim. (Cl. 43—42.04)

This invention relates to fish lures, and it has reference more particularly to lures of that kind known as "plugs," and designed especially for use in trolling for salmon, but not to be restricted thereto.

The principal objects of this invention are to provide a plug that will simulate the swimming action of a crippled herring; that provides convenience and has durability in its hook-up; that will give uniformity in performance and can be manufactured at a relatively small cost.

More specifically stated, the objects of this invention reside in the provision of a lure or plug having two groups of fish hooks, attached through the mediacy of a flexible cord or chain to the rear end portion of the plug; and wherein the plug is equipped on its under side, near its forward and rearward ends, with spring clips of novel character whereby one of the groups of hooks may be normally held near the forward end of the plug with the other group of hooks trailing at its rearward end, in such a manner that when a fish strikes a hook of either group, the other group will be immediately released to supplement the first in holding the fish and both groups will trail beyond the rear end of the plug through the cord connection.

Further objects and advantages of the invention are to be found in the provision of a novel form of nose clip whereby to facilitate attachment of the plug to a leader and which also serves as a means to eliminate damage to the plug.

Still further objects reside in the various details of construction and combination of parts, and in the use of the plug as will hereinafter be fully described.

In accomplishing these and other objects of the invention, I have provided the improved details of construction, the preferred forms of which are illustrated in the accompanying drawings, wherein—

Fig. 1 is a perspective view of a fish lure or plug embodying the improvements of the present invention therein.

Fig. 2 is a view of the same illustrating the hooking of a fish and the trailing of the hooked fish beyond the plug.

Fig. 3 is a side view of the head end portion of the plug, particularly illustrating an alternative form of nose clip for leader attachment and to eliminate damage from rocks and the like.

Fig. 4 is an under side view of the tail fins as attached to the plug body.

Fig. 5 is a detail view of the rear end portion of the plug showing the rear clip and its mounting means.

Fig. 6 is a detail view of the front end portion of the plug, particularly showing the front line clip and nose or bumper clip attachment means.

Fig. 7 is a side view of the plug of Fig. 1 equipped with an alternative form of nose clip.

Fig. 8 is a front end view of the plug of Fig. 3.

Referring more in detail to the drawings—

The plug body is designated in its entirety by reference numeral 10, and it comprises an elongated, wooden body, round in cross section, and tapered along its rear end portion to a rounded end 12. At its front end, the body is cut on a bevel forming a somewhat dished surface 13 that slopes from the bottom edge of the plug rearwardly and upwardly to near the upper edge and there it is formed with a forwardly directed shoulder 14 with an under surface that extends forwardly at an angle of approximately 90° from the beveled surface 13. The shoulder 14, coacting with the front end surface of the plug, forms a transverse trough 15 that opens to the opposite sides of the plug.

Fixed to substantially the center of the forward end surface 13 of the plug is the nose or bumper clip 20, shown best in Fig. 6 as comprising a single piece of strong spring wire, formed with an eye or loop portion 21 at one end that lies flatly against surface 13 and through which eye a screw 22 is applied into the plug to secure the clip in place. At the upper side of the eye, the wire is bent upwardly and forwardly, then downwardly over the rounded head 22' of the screw to form a loop 24 in which the loop 25e of the fish line leader 25 is applied. The wire extends close to the screw head, then downwardly along the surface 13 and is curved downwardly and rearwardly about, but slightly spaced from the lower edge of the plug as a sort of bumper that is effective in preventing damage to the forward end edges of the plug.

In Fig. 3, as an alternative form of construction, the nose clip 20' is shown as extending along the under side of the plug from its forward end rearwardly and having a hook 28 at its end which holdingly engages the looped portion of a hook holding spring clip 30 which will next be described, but in Figs. 1, 2 and 6, I have shown the nose clip as terminating just back of the forward edge of the forward end of the plug.

Applied to the plug body, at the under side and near the forward end, is the hook holding clip 30. As noted best in Fig. 6, this comprises a piece of spring wire, bent to form an eye 31 that lies flatly against the under side of the plug and through which a screw 32 is applied to secure the clip to the plug. The wire extends from the forward side of the eye, then is bent downwardly and rearwardly to form a loop 33, with the end of the wire lying closely adjacent or against the rounded head 32' of the screw and its end slightly downwardly curved away from the head to provide a sort of entrance mouth to the loop which opens toward the rear end of the plug.

Likewise, fixed on the under side of the plug body, near its rearward end, is a spring wire clip 35. This is made from a single piece of suitable spring wire, bent to form an eyelet 36 at its forward end that is placed flatly against the under side of the plug and is secured by a screw 37 passed therethrough. The wire extends rearwardly from the loop and is then formed into two parallel loops 38—38' that lie in planes lengthwise of the plug and close together, as noted in Fig. 4. From the loop 38', the wire extends rearwardly along the plug and then has a sharpened, upturned end portion 39 which is pressed into the plug, as seen in Fig. 5.

Secured to the plug, beneath this clip, is a piece of suitable material such as cat skin, forming a pair of fins 40—40 that extend rearwardly in diverging relationship, as noted in Fig. 7.

In connection with this plug, I prefer to use two treble hooks, as designated at 45 and 46. In Figs. 1 and 2, I have shown treble hooks 45 attached to one end of a short line 48 that is secured at its other end to the loops 38—38', while the treble hook 46 is secured by a ring 49 through which the line 48 is freely passed. Also, a ring 50 is looped through ring 49 and this is adapted to be applied within the loop 33 of clip 30 so as to releasably secure that treble hook to the forward end portion of the plug, as has been shown in Fig. 1.

It is the usual procedure, after the ring 50 has been applied to the loop of clip 30 as in Fig. 1, to then extend the line 48 from ring 49 between the loops 38—38' so that the treble hook 45 will trail just rearward of the plug.

In the showing of Fig. 7, the hook groups 45 and 46 are attached to line 48 which is reeved through the loops 38—38' of clip 35, and in trolling, the loop at the forward end of this line 48 is releasably applied within the loop 33 of clip 30.

In the arrangement and design of the clips 30 and 35, it is intended that the stiffness of the wire loops 33 and 38—38' be such as to resist the release of the ring or line loop from the clips until a substantial pull has been applied on the line by the fish. Thus, with the parts set as in Fig. 1, a strike on the rear treble hook will pull the line 48 from between the loops 38—38' and then pull the ring 50 from clip 30 permitting the hook 46 to slide down the line 48 to catch in the fish and supplement the holding of hook 45, as has been indicated in Fig. 2.

If the strike is on the forward hook, as seen in Fig. 1, then this hook will be pulled free from the clip 30, and finally the hook 45 is disengaged from loops 38—38' so that the hook 46 slide down line 48 to the hook 45.

Another feature of this invention resides in the formation of life-like eyes.

Having thus described my invention, what I claim as new therein and desire to secure by Letters Patent is:

A fishing lure comprising a plug body, means at the forward end of the body for its attachment to a fish line, forward and rearward spring clips fixed to the plug body on its under side, a hook attaching line permanently fastened at its forward end to the rearward clip portion of the plug body, a fish hook attached to the rear end of said hook attaching line and adapted to be trailed by said line at a substantial distance rearward of the plug body, and a second fish hook with an attaching ring freely receiving said hook attaching line for travel of said hook along the said attaching line between its point of connection with the plug body and the first mentioned hook; said attaching ring being releasably secured to the forward spring clip, thereby to draw the hook attaching line forwardly and thus to shorten the trailing distance of the first mentioned hook relative to the plug, and said trailing portion of said hook attaching line then being releasably secured to the rearward spring clip to trail the first mentioned hook; said trailing portion of said hook attaching line and said hook attaching ring being releasable from their respective spring clips by a pull thereon caused by strike on either hook.

ELLIS E. WHITE.

REFERENCES CITED

The following references are of record in the file of this patent:

UNITED STATES PATENTS

| Number | Name | Date |
|---|---|---|
| 1,182,010 | Heddon | May 9, 1916 |
| 1,840,273 | Lang | Jan. 5, 1932 |
| 2,017,903 | Johnson | Oct. 22, 1935 |
| 2,102,494 | Stolley | Dec. 14, 1937 |
| 2,181,254 | Wilson | Nov. 28, 1939 |
| 2,190,449 | Goldammer | Feb. 13, 1940 |
| 2,220,133 | Sweeney | Nov. 5, 1940 |
| 2,275,869 | Seaton | Mar. 10, 1942 |